US009479522B1

(12) United States Patent
Cirkovic

(10) Patent No.: US 9,479,522 B1
(45) Date of Patent: Oct. 25, 2016

(54) METHOD AND APPARATUS FOR MANAGING CONTENT DISTRIBUTION USING CONTENT SIGNATURES

(75) Inventor: Sasha Cirkovic, San Francisco, CA (US)

(73) Assignee: Tellabs, Inc., Naperville, IL (US)

( * ) Notice: Subject to any disclaimer, the term of this patent is extended or adjusted under 35 U.S.C. 154(b) by 791 days.

(21) Appl. No.: 13/102,953

(22) Filed: May 6, 2011

(51) Int. Cl.
G06F 15/173 (2006.01)
H04L 29/06 (2006.01)

(52) U.S. Cl.
CPC .................. *H04L 63/1416* (2013.01)

(58) Field of Classification Search
CPC .................................................. H04L 63/1416
USPC .................... 709/230–232, 224; 370/252
See application file for complete search history.

(56) References Cited

U.S. PATENT DOCUMENTS

| | | | |
|---|---|---|---|
| 6,161,198 A * | 12/2000 | Hill et al. | 714/15 |
| 7,653,647 B2 * | 1/2010 | Borthakur et al. | 707/687 |
| 7,657,104 B2 * | 2/2010 | Deninger et al. | 382/224 |
| 7,689,614 B2 * | 3/2010 | de la Iglesia et al. | 707/713 |
| 2001/0021176 A1 * | 9/2001 | Mimura et al. | 370/235 |
| 2002/0083261 A1 * | 6/2002 | Vasquez et al. | 710/317 |
| 2003/0009585 A1 * | 1/2003 | Antoine et al. | 709/238 |
| 2003/0116620 A1 * | 6/2003 | Song | 235/375 |
| 2003/0162594 A1 * | 8/2003 | Rowe | 463/42 |
| 2004/0008676 A1 * | 1/2004 | Thomas | 370/389 |
| 2004/0030930 A1 * | 2/2004 | Nomura | 713/201 |
| 2004/0162989 A1 * | 8/2004 | Kirovski | 713/189 |
| 2005/0127171 A1 * | 6/2005 | Ahuja et al. | 235/382 |
| 2005/0229254 A1 * | 10/2005 | Singh et al. | 726/23 |
| 2007/0271371 A1 * | 11/2007 | Singh Ahuja et al. | 709/224 |
| 2009/0049469 A1 * | 2/2009 | Small et al. | 725/35 |

* cited by examiner

*Primary Examiner* — Brian J Gillis
*Assistant Examiner* — Michael A Keller
(74) *Attorney, Agent, or Firm* — JW Law Group; James M. Wu

(57) ABSTRACT

A method and apparatus for managing packet flow based on content signatures are disclosed. A process of netflow management, in one embodiment, is able to receive a packet flow traveling through a communications network and obtain a signature from the packet flow. Upon retrieving a predefined signature from storage in accordance with the signature, the signature and the predefined signature are compared. A message of unauthorized distribution associated with the packet flow is issued when bit pattern of the signature matches with bit pattern of the predefined signature.

19 Claims, 9 Drawing Sheets

METHOD AND APPARATUS FOR MANAGING CONTENT DISTRIBUTION USING CONTENT SIGNATURES

RELATED APPLICATION

This application is related to the co-pending applications, Application No. 12976912, filed 2010 Dec. 22, entitled "Apparatus and Method for Providing Content-Based Netflow Accounting," which is assigned to the Assignee of the present invention.

FIELD

The technical field of embodiments of the present invention relates to communication networks. More specifically, embodiments of the present invention relate to monitoring and managing netflow and/or packet flows using digital signatures.

BACKGROUND

A network environment typically includes hundreds and thousands network nodes and/or devices, such as routers, hosts, hubs, and switches, capable of delivering information using packets or packet flows from source devices to destination devices. Information, content, and/or payload pertaining to the transfer of packet(s) through the network are usually embedded within one or more packets. Typically, each packet traveling through a network can be treated independently from other packets in a packet stream or flow. For example, a node or a router within a network processes incoming packets and determines where the packet(s) should be forwarded. To process a packet, a node which may include one or more network elements ("NEs"), for example, reads information stored at the header of packet to determine a destination Internet Protocol ("IP") address, and subsequently forwards the packet according to the destination IP address.

To manage and monitor packet traffic in a high-speed conventional communications network, a measurement of netflow within IT (information technology) industry has been developed. A netflow, in one example, is a mechanism to control net traffic and measure network usage by end users. Each netflow or net flow may include a group of packets, which may carry data, video, audio, or a combination of data, video, and audio information. Some flows last for a long time due to continuous data transfer while other flows are transient because they exist for a short period of time such as a ping command. As such, facilitating and monitoring packet flows traveling through a routing engine (or a router) is a critical network task.

With more and more essential information traveling through the network, stable and reliable network become vital to every end user. Maintaining and securing network traffic between intended and unintended recipient(s) become more important. Conventional network providers typically rely on attached network device to maintain data integrity. Network usually does not have the ability to monitor content of the packet flow traveling through the network. Network generally transmits packets or packet flows regardless what content that packets actually carry.

SUMMARY

A method and signature-based content identifier ("SCI") are capable of managing packet flow based on signatures or digital signatures. A process of SCI process, in one embodiment, monitors and receives one or more packet flows traveling through a communications network. After reading the header of packet flow, signature or signatures associate with content of packet flow are obtained or extracted. Upon retrieving a predefined signature from storage in accordance with the signature, the signature and the predefined signature are compared. A message of unauthorized distribution associated with the packet flow is issued when the bit pattern of signature matches with the bit pattern of predefined signature.

Additional features and benefits of the exemplary embodiment(s) of the present invention will become apparent from the detailed description, figures and claims set forth below.

BRIEF DESCRIPTION OF THE DRAWINGS

Exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
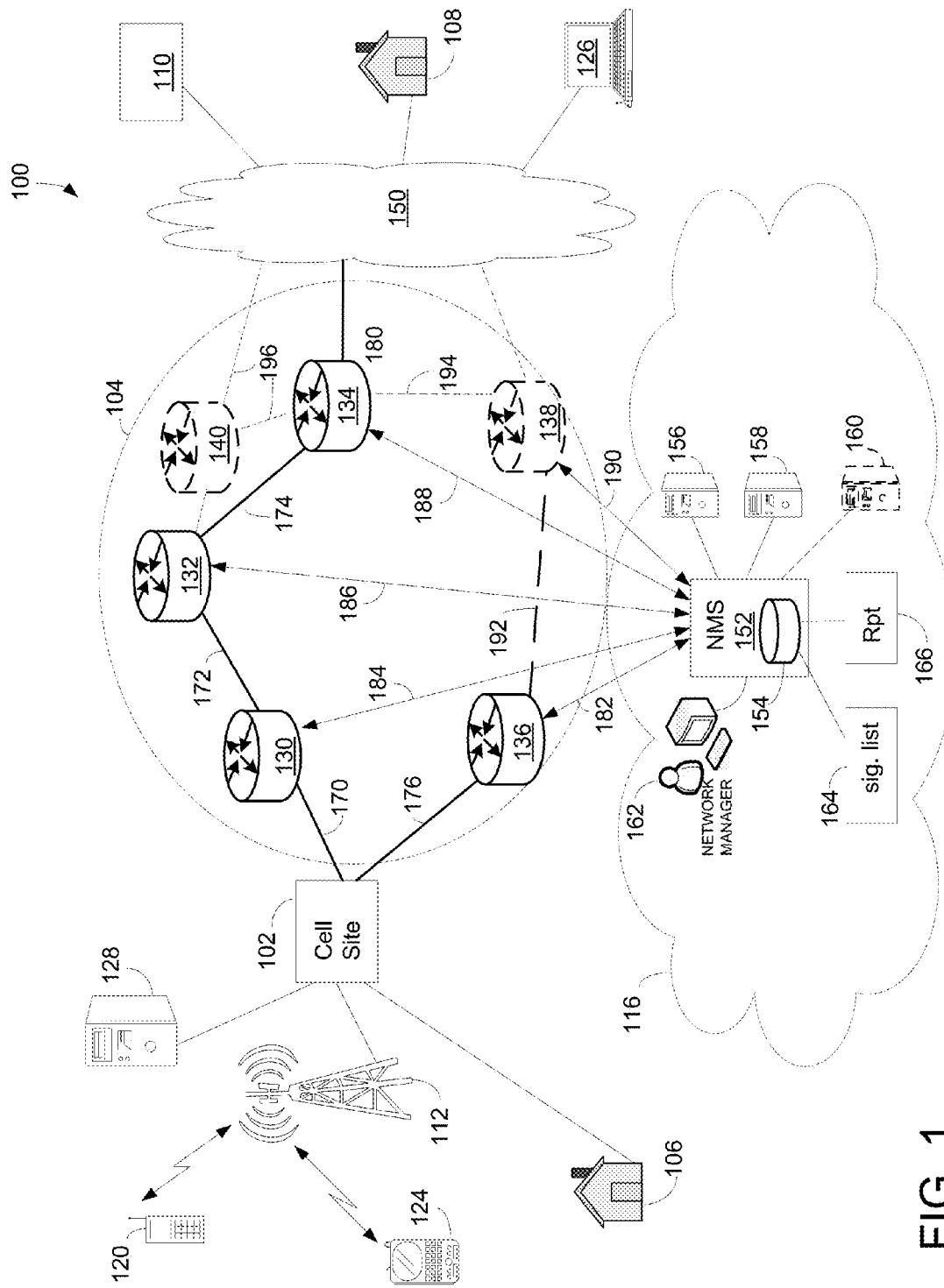
FIG. 1 is a block diagram illustrating a computer network having multiple network nodes configured to monitor packet flow based on signatures accounting in accordance with one embodiment of the present invention.

Exemplary embodiment(s) of the present invention is described herein in the context of a method, system and apparatus of identifying content of netflows or packet flows using signatures.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

References to "one embodiment," "an embodiment," "example embodiment," "various embodiments," "exemplary embodiment," "one aspect," "an aspect," "exemplary aspect," "various aspects," et cetera, indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the interest of clarity, not all of the routine features of the implementations described herein are shown and described. It will, of course, be understood that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

In accordance with the present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

IP communication network or IP network or communications network means any type of network having an access network (i.e., radio access network) capable of transmitting data, for example of ATM (Asynchronous Transfer Mode) type, on a transport medium, for example of the TCP/IP or UDP/IP type. ATM cells are the result of decomposition (or segmentation) of packets of data, for example of IP type, and those packets (here IP packets) comprise an IP header, a header specific to the transport medium (for example UDP or TCP) and payload data. The IP network may also be a satellite network, a cable (xDSL) network, a mobile or cellular network (GPRS/EDGE, or UMTS), the evolution of the UMTS known as LTE (Long Term Evolution), DVB-H (Digital Video Broadcasting-Handhelds)), or a hybrid (satellite and terrestrial) network.

A signature-based content identifier ("SCI") capable of managing packet flow based on signatures or digital signatures is disclosed. SCI, in one embodiment, monitors and receives one or more packet flows traveling through a communications network. After reading the header of packet flow, signature or signatures associate with content of packet flow are obtained. Upon retrieving a predefined signature from storage in accordance with the signature, the signature and the predefined signature are compared. A message of unauthorized distribution associated with the packet flow is issued when the bit pattern of signature matches with the bit pattern of predefined signature.

FIG. 1 is a block diagram 100 illustrating a computer network having multiple network nodes configured to monitor packet flow based on signatures in accordance with one embodiment of the present invention. Diagram 100 includes a cell site 102, a switching network 104, a central office ("CO") 116, and Internet 150. Internet 150 is further coupled with a user 108, a content provider 110 such as a website, and a host 126. CO 116 provides network management to facilitate network communication between users 106-108 via switching network 104, Internet 150, and cell site 102. It should be noted that the underlying concept of the exemplary embodiment(s) of the present invention would not change if one or more blocks (or devices) were added to or removed from diagram 100.

Cell site 102 is capable of communicating with mobile devices such as cellular phone 120 and handheld device 124 via radio tower 112. It should be noted that cell site 102 may include additional radio towers as well as other land based switching circuitry. The cell stations such as cell site 102 can be configured to support wireless communications as well as wired communications.

Switching network 104, as shown in FIG. 1, is capable of transporting or routing information (or packets) between users and/or providers connected to the network. In one embodiment, network 104 includes network elements ("NEs") 130-140 which are also known as nodes and/or routers. An NE, as a logical network entity, is able to manage one or more physical network devices. The physical network devices include routers, modems, hubs, bridges, servers, switches, et cetera. NEs 130-140 are interconnected via connections 170-176 and are used for routing information and/or data packets to and from network clients and/or hosts. Network client in one example may include one or more routers, switches, hosts, users, base stations, and the like. For example, switching network 104 uses NEs 130-134 to route a packet stream from users 106 to 108 via cell site 102 and Internet 150.

NEs 130-140, in one aspect, are routers, switches, bridges, or a combination of routers, switches, and bridges. The total number of NEs used in switching network 104 may increase or decrease over time depending on the demand of network services. For example, with increasing demand of video streaming, the number of NEs as illustrated in diagram 100 can grow to meet such demand. One aspect of network growth is to add additional NEs into an existing pool of NEs to expand processing and/or service capacity. For instance, NEs 138-140 are recently added NEs to the pool of NEs 130-136 for enhancing routing or processing capacities. The number of NEs can grow into hundreds or thousands depending on the network service demand. Dotted lines of NEs 138-140 as well as connections 192-196 illustrate that they are newly added or will be added.

During an exemplary operation, when user 106 sends a packet to user 108, the packet travels from cell site 102 to routers 130-134 via connections 170-174. After the packet enters Internet 150 via connection 180, it is subsequently received by user 108. To route and facilitate data traffic efficiently, NEs 130-140 in switching network 104 are required to be managed and monitored. To monitor network performance, CO 116, in one embodiment, deploys a network management system ("NMS") 152 or other performance monitoring system to monitor status of switching network 104 based on statistics generated by NEs such as NEs 130-140.

CO 116 includes NMS 152, computers or servers 156-158, network administrator 162, and a report generator 166. NMS 152 further includes signature-based content identifier ("SCI") 154, which, for example, includes a database storing one or more lists of signatures or predefined signatures 164 received from subscribers. Each signature, in one embodiment, includes subscriber identification ("sid") and content identification ("cid"). Alternatively, the signature includes additional fields to indicate what to do once the traffic identified by signature is found. For example, if the subscription from a subscriber requesting marketing statistics, NMS 152 or SCI 154 processes and generates a marketing report via report generator 166 when traffic identified by signature(s) is found. In one aspect, report generator 166 can generate various types of reports and/or statements in response to users' or subscribers' requests.

Computers 156-158 can be any types of digital processing servers, personal computers ("PCs"), workstations, et cetera. Computers 156-158 form a pool (or cluster) of servers capable of scaling up or down processing capacity in response to the number of NEs in switching network 104. NMS 152 deploys computers 156-158 to monitor and record information relating to content-based netflow from NEs 130-140 to switching network 104. In one embodiment, SCI 154 is implemented by one of computers 156-158.

NMS 152 provides a content-based netflow management to monitor and control packet flows traveling through switching network 104. NMS 152, in one embodiment, includes a local memory such as memory 164 and SCI 154, wherein SCI 154 further includes signature registers, comparator, content match controller, and the like. SCI 154 can be implemented in hardware, firmware, software, or a combination of hardware, firmware, and software. While the local memory may be able to store a list or lists of signatures, signatures can also be stored in a remote storage device.

The signature can also be referred to as content identifier, content signature, content key, content mark, content name, classification, and the like, and is formed with a set of bit pattern. The bit pattern, which may include anywhere from 8 bits to 64 bits, is situated or placed at the header of a packet with predefined bit positions. In one embodiment, the signature includes multiple fields such as a field may represent subscriber identifier ("sid") and another field may represent content identifier ("cid"). Alternatively, the signature also includes a task field containing information regarding how to handle the detected packet flow.

A function of using digital signature or signature is to track data transmitting activities over a communications network. Depending on applications, finding an identified or signature traffic (or netflow) using signature detection can be performed in real-time. Identified traffic or signature traffic refers to data streams or packet flows in the network traffic containing signatures. NMS 152, for instance, is capable of identifying signature traffic depending on the signatures in the header of packet flows. Network provider, in one embodiment, employs content signatures to provide information or data security, protecting subscribers' intellectual property ("IP"), preventing illegal distribution, marketing research, usage tracking, et cetera.

To implement digital and/or content signature associated with data content, subscriber(s) attaches or inserts signature(s) to packet flows carrying sensitive or targeted data content. The subscriber such as network client 108 subscribes a monitoring service from a network provider such as NMS 152 by providing signatures for monitoring and tasks once the identified traffic is found. The signature, in one example, also includes information regarding how to handle the traffic identified with the signature. Alternatively, subscriber's account contains information regarding how to handle identified traffic.

Upon detecting a packet flow embedded with a signature traveling through a communications network, SCI 154 extracts the signature and compares the signature with predefined signature list 164. When a predefined signature is found in the packet flow, a signature match is issued or recorded. It should be noted that signature storage, comparator, and signature match controller can be implemented in SCI 154, NMS 152, servers 156-160, or a combination of NMS 152 and servers 156-160. Also, the signature, comparator, and signature match controller may be performed by a single computing engine.

During an operation, NMS 152, which is managed by network manager 162, receives a set of predefined signatures or predefined signature lists which, for instance, are submitted by subscribers or network clients over the network. Once the signature lists are loaded into local memory 164, NMS 152 routes and/or collects information from every packet flow traveling through nodes 130-140 via connections 182-190. Depending on bit patterns of signatures, SCI 154, for example, may continuously compare signatures embedded in packet flow(s) with predefined signatures in memory 164 and tracks signature traffics when they are located through comparison. In one embodiment, SCI 154 is able to compare signatures and address(es) simultaneously. Alternatively, SCI 154 separates a signature into multiple portions such as sid and each portion or portions are compared with predefined signature portions independently or simultaneously.

Since IP communication become more ubiquitous, there is ongoing need and benefit to monitor user traffic patterns or contents in order to securing data contents, protecting IP, generating marketing statistics, and the like. By adding a content signature to specify user content such as photos or books, the network is able to track packet flows carrying protected content as they travel through various IP or other networks. It should be noted that SCI 154 is applicable to many types of network such as Ethernet, PSTN, Optical, SDH/SONET, et cetera.

An advantage of using SCI 154 to identify protected, sensitive, or confidential content is to track identified traffic to enhance content protections as well as information flow through the cyber network. The network provider, for example, uses SCI 154 to identify user content with signatures and identifies illegal trespassing of protected content over secure and/or non-secure IP links. Marketing statistic or data can also be accumulated or collected using signatures, traffic origins and destinations.

Figure 2:
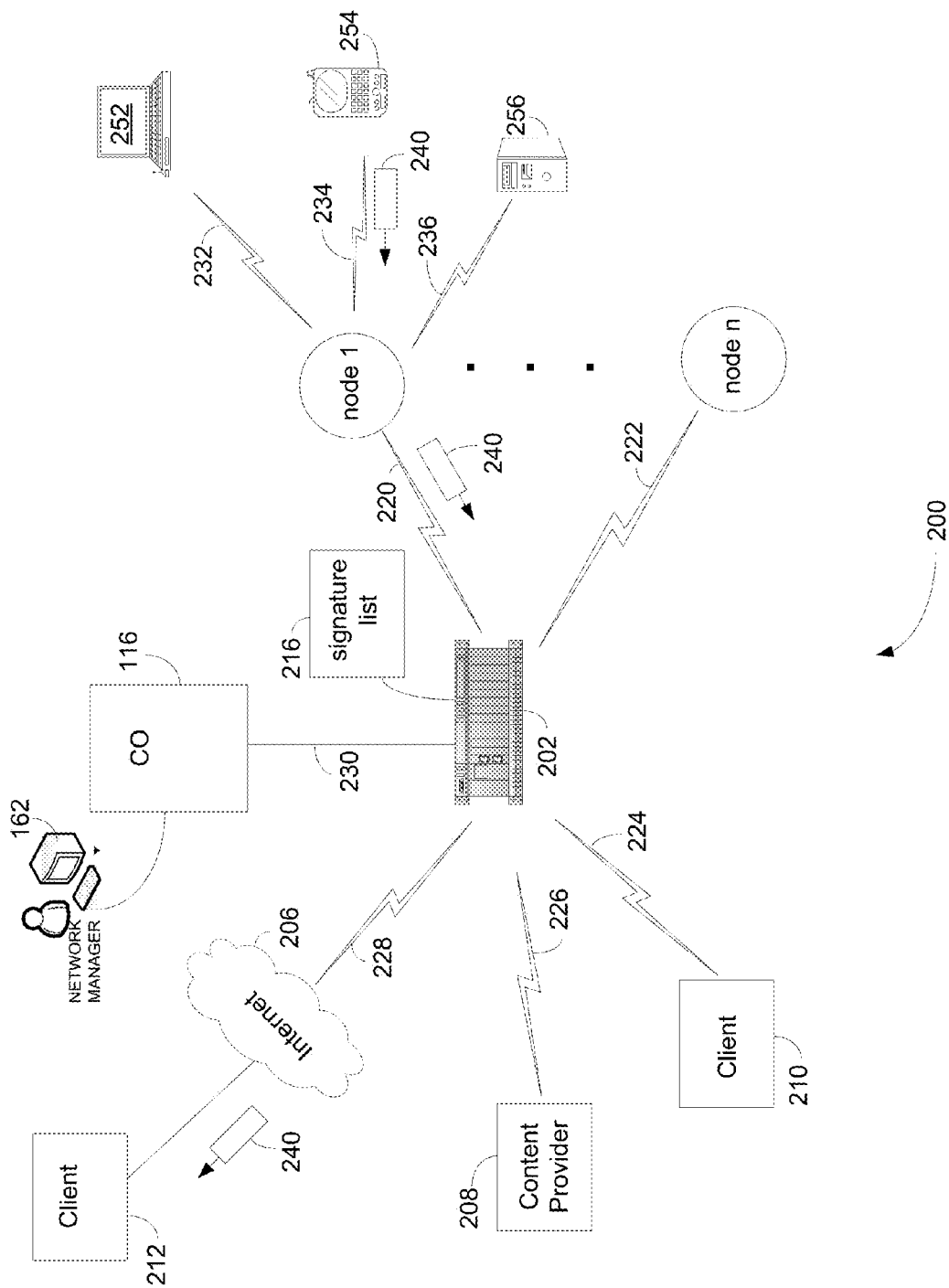
FIG. 2 is block diagram illustrating an exemplary network management system ("NMS") capable of managing netflow based on signatures in accordance with one embodiment of the present invention.

FIG. 2 is a block diagram 200 illustrating an exemplary network management system ("NMS") capable of managing netflow based on signatures in accordance with one embodiment of the present invention. Diagram 200 includes NMS 202, CO 116, content provider 208, clients 210-212, and network nodes. Network nodes, also known as nodes, include node 1 through node n wherein n can be any integer number. In a communications network, a physical network node or node can be an NE or a cluster of network devices, such as a router, modem, hub, bridge, switch, handset, computer, server, workstation, et cetera. Node 1, for example, can be a network entity capable of coupling to host 252, portable device 254, and server 256 via connections 232-236. It should be noted that the underlying concept of the exemplary embodiment(s) of the present invention would not change if one or more blocks (or devices) were added to or removed from diagram 200.

NMS 202, which can be a router or switch, is configured to direct or route flow traffic between nodes and/or clients 210-212. A network manager or administrator 162 is able to communicate with NMS or router 202 via CO 116. In one aspect, CO 116 is coupled to NMS 202 via connection 230. Alternatively, CO 116 can be configured to reside within NMS 202. NMS (or router) 202 can also be configured to provide routing services to remote clients such as client 212 via Internet 206. Connections 220-228, which can be wired, wireless, or a combination of wired and wireless cables or connections, are employed to connect NMS 202 to clients 210-212, content provider 208, and nodes. Note that client (s) can be servers, routers, switches, computers, user's equipments, network equipments, network elements, websites, and so forth.

NMS or router 202, in one aspect, performs a function of a network hub capable of routing packet flows between various NEs. A packet flow, for example, is a packet or a packet stream traveling through a network. At any given time, hundreds or thousands packets or packet streams may be traveling through a network simultaneously. A function of network hub is to monitor, inspect, and route packet streams between clients and nodes. For example, a portable handheld device 254 sends a flow 240 to client 212 via node 1. When router 202 detects flow 240 at its port connected to connection 220, router 202 identifies the destination addresses from the header of flow 240, flow 240 is subsequently sent by router 202 via its port connected to connection 228. Flow 240 will reach its destination via Internet 206.

To monitor and track content-based packet flows, NMS or router 202, in one embodiment, includes SCI, a storage or database ("DB") 216 for storing predefined signatures or lists supplied by network clients or subscribers. Each predefined signature contains one or more unique bit patterns for identifying content. The bit pattern, for example, is a set of bit sequence (i.e., 111100001111 . . . ) used to match signature(s) extracted from the header of a packet. The specific bit pattern or sequence is predetermined by subscribers and they may be preloaded to SCI, or NMS 202 via CO 116.

During an operation, NMS or router 202 is responsible for routing data or packets between connected devices and/or nodes such as clients and nodes using a predefined QoS or predefined traffic priorities to ensure smooth routing. During the process of routing, each packet flow traveling through router 202 is examined and compared in view of signature lists in memory 216. Upon identifying an unauthorized content distribution, the packet or packet flow may be blocked and/or rerouted to a special module or handler.

One advantage of tracking or monitoring signature-based content flow is to aggregate useful data during the routing process to improve network security, network optimization, IP protection, and/or user preferences. Note that SCI is applicable to any IP-based networks such as mobile backhaul and/or xDSL environment. SCI, in one aspect, enables interested parties or subscribers to identify and verify accurate account of content usage agreed between interested parties and purchasers. For example, an electronic book vendor may decide to share a bit pattern of signature specifying a book title with various service providers. Service providers will use this signature to effectively search and identify targeted content. The signature with a secret bit pattern may be used to enhance network security. Alternatively, signature may be encrypted with some algorithms for security.

Figure 3:
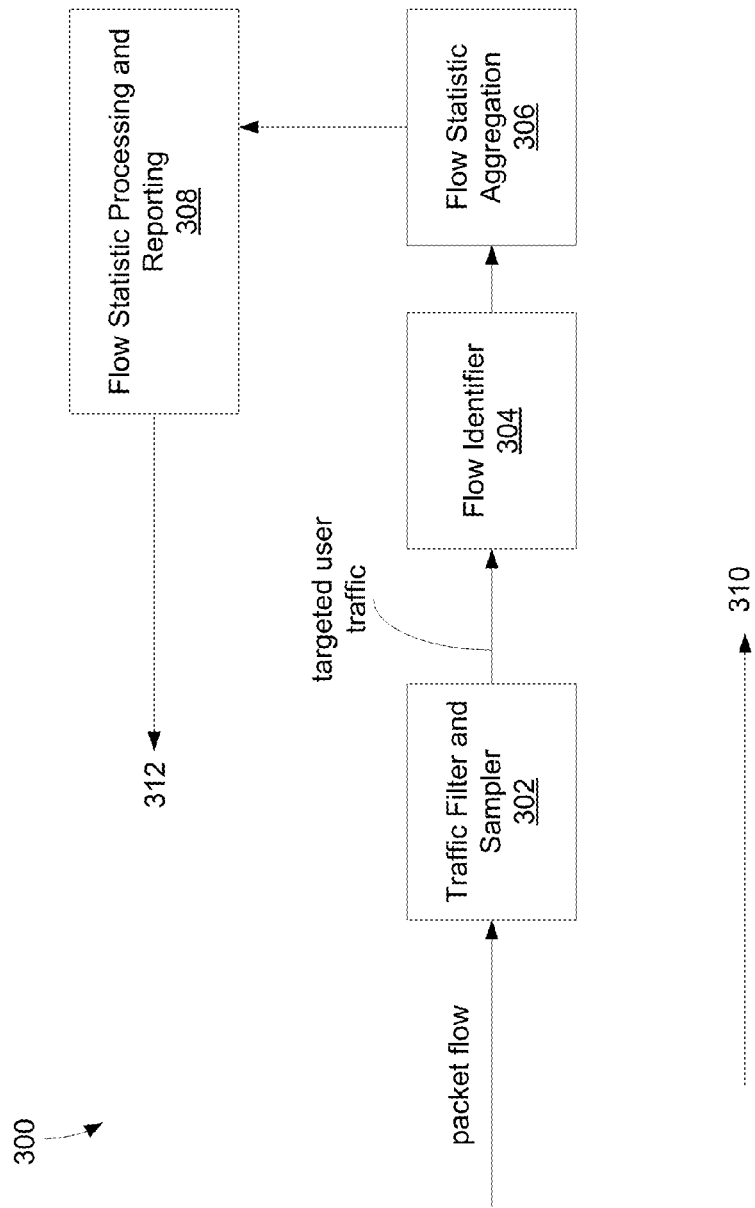
FIG. 3 is a logic block diagram illustrating a process of tracking and monitoring identified packet flows in accordance with one embodiment of the present invention.

FIG. 3 is a logic block diagram illustrating a process of tracking and monitoring identified packet flows in accordance with one embodiment of the present invention. A data processing flow 300 illustrates a logic control process configured to inspect and identify content-based net flows passing through the NMS. While a packet flow proceeds to be processed and routed via pass 310, a copy of packet flow enters block 302. A packet flow can contain multiple packets that share the same addresses, ports, and IP protocol. For example, all packets in a packet flow have the same source IP address, destination IP address, source port number, destination port number, and so on.

At block 302, a traffic filtering process is performed. The filtering process allows a user or network administrator to identify packet flows in accordance with signatures and tracking the identified packet flows. For example, a subscriber can choose a list of known hosts for monitoring. At block 304, SCI compares extracted signatures from packet flows with predefined signatures to determine which packet flows need to be monitored and tracked. Various flow statistic values are aggregated at block 306. In one embodiment, SCI processes packet flows and records result of the processing in the DB. The signature-based content information, for example, includes source IP address, destination IP address, source port number, destination port number, bit patterns for content signatures, and so forth. At block 308, a report can be generated anytime upon request. Alternatively, an action in response to the matching result may be taken in accordance with subscription. In one embodiment, the subscription account which is set up by a user indicates the action to be taken when a packet flow is identified with a signature. Also, the subscription can be requested and issued by a network client such as subscribers or hosts. At block 312, a handler is activated to handle the identified packet flow(s).

To track a packet flow within a network, a signature with embedded bit pattern specifying user content (i.e., video file, music, book, and photo) is employed. The signature which is previously agreed between content provider (or subscriber) and networking service provider contains a unique bit pattern enabling targeted and easy detection of specific content. Note that the bit pattern of a signature can be made unique by using a random number generation and also can be made secret among interested parties by using an encryption method.

Figure 4:
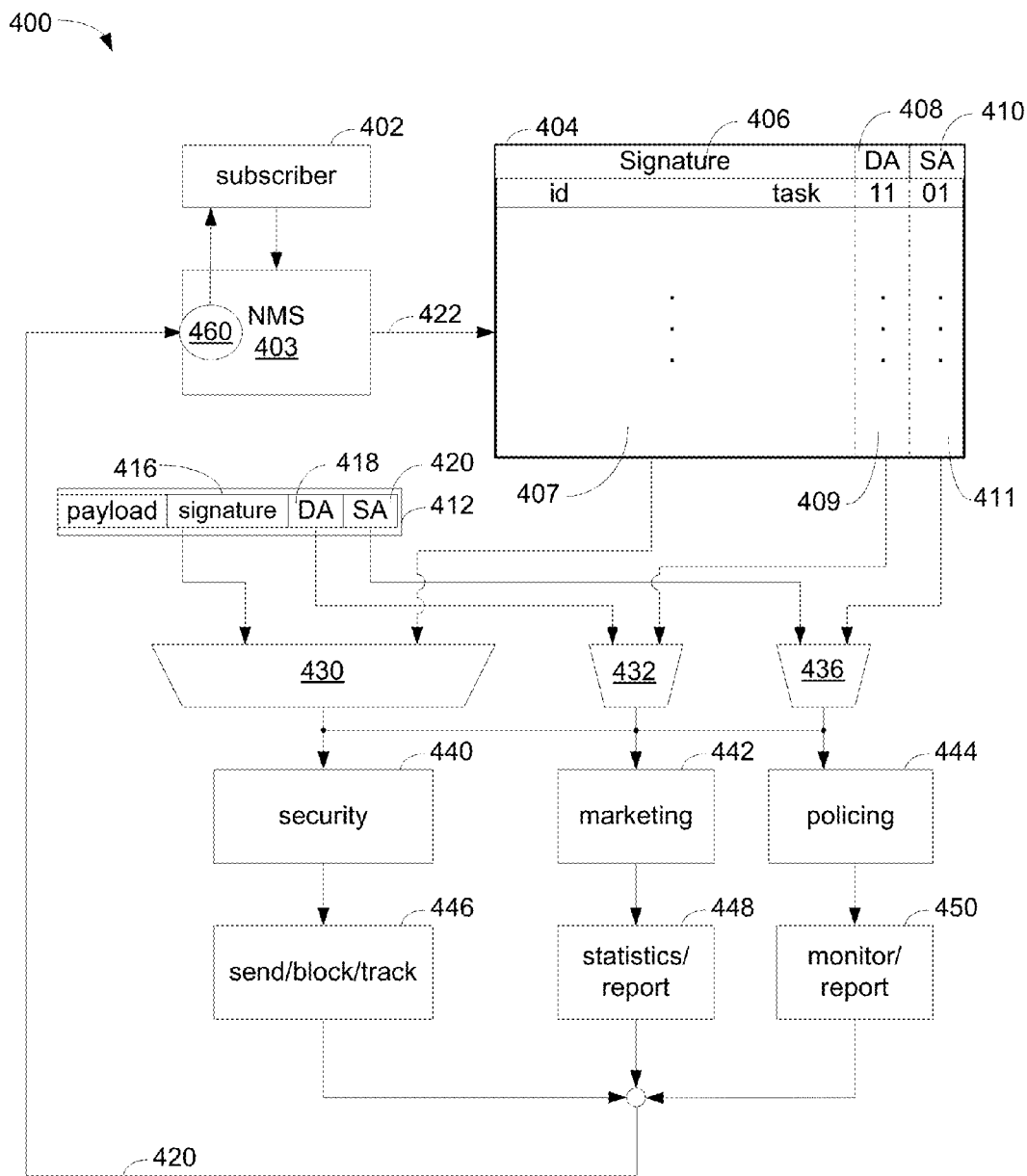
FIG. 4 is a logic diagram 400 illustrating a packet process 400 capable of identifying signature-based packet flow in accordance with one embodiment of the present invention.

FIG. 4 is a logic diagram 400 illustrating a packet process 400 capable of identifying signature-based packet flow in accordance with one embodiment of the present invention. At block 402, a subscriber provides one or more signature lists to NMS 403 for netflow tracking. NMS 403, in one embodiment, includes SCI 460. The subscriber, for instance, can be any network clients including, but not limited to, content providers, network administrators, individual hosts, end users, web commerce, industries, government agency, academic institutions, and the like.

Upon receipt of a signature list from the subscriber, NMS 403, which can be a router, stores the signature list at DB 404 via connection 422. In one embodiment, DB 404 is located in NMS 403. Alternatively, DB 404 can be located at a remote location connected via a network. DB 404 stores information for signature-based content identifier or SCI 460 for tracking packet flow. DB 404, in one embodiment, includes an array having multiple entries for storing information or records relating to packets or packet flows. For example, an entry of signature-based table includes a source address (SA) 410, a destination address (DA) 408, and signature 406 having a unique bit pattern. In one embodiment, signature includes multiple fields such as id field and task field. Depending on the size of network, DB 404 can be a large database because it can possibly store thousands or millions of entries.

When a packet flow or a packet 412 arrives, signature 416 of packet 412 is compared with a bit pattern 407 at comparator 430. Alternatively, comparator 432 is used to compare DA 418 with a bit pattern 409 from DB 404, comparator 436 is used to compare SA 420 with a bit pattern 411. Depending on the applications, comparators 430-436 can be selectively performed. Alternatively, comparators 430-436 are performed simultaneously. The results of comparison are processed and stored. The exemplary embodiment of SCI 460 monitors data traffic using signatures having given patterns and is capable of generating statistics from results of monitoring and matching of signatures that enable the network to identify the content, origin, and/or destination of data packet.

Security 440, in one embodiment, uses SIC 460 to enhance data and/or network security via identifying the content carried by packets. When confidential data or national secret identified by signature(s) is being transmitted without authorization, security 440 will be able to isolate identified packet flows and take corresponding action based on the subscription request. For example, subscription may request security 440 to reroute the unauthorized packet flows to an alternative destination. Event handler 446 is configured to reroute or stop the packet flow carrying confidential information. Alternatively, event handler 446 broadcasts or issues a warning to the destination that the packet flow carries unauthorized data.

Marketing unit 442, in one embodiment, uses SIC 460 to enable network operator to track number of sessions when specific content over the Internet have been accessed. The content can be, but not limited to, books, photos, articles, product names, and the like. Report unit 448 is able to generate reports and/or statistics based on the data stored in the content-based flow upon demand/request. The request/demand can be issued by any interested parties or network clients such as market agency and end user. For instance, the market agency can request such services via service provider(s) to provide info on how many users have accessed and/or read a predefined specific online book.

Policing or tracking unit 444 uses SCI 460 to monitor and track illegal activities or illegal distributing protected materials such as copyrighted book or protected proprietary data. Unit 444, in one embodiment, is able to identify source and destination of massive continuous video streaming based on the data collected in accordance with signatures. For example, illegal transfer of medical data may be stopped before the packets travel to unintended recipient(s). Unit 450, which is similar to unit 448, is able to report or block the net flow based on the content of the net flow.

Packet process 400, in one embodiment, uses SCI 460 to identify content, source, and/or destination of a packet flow if the signature from the header of packet flow matches with one of predefined signatures in DB 404. Based on content definition, the originator of the contents can be identified and accounted in accordance with the content-based net flow accounting.

Figure 5:
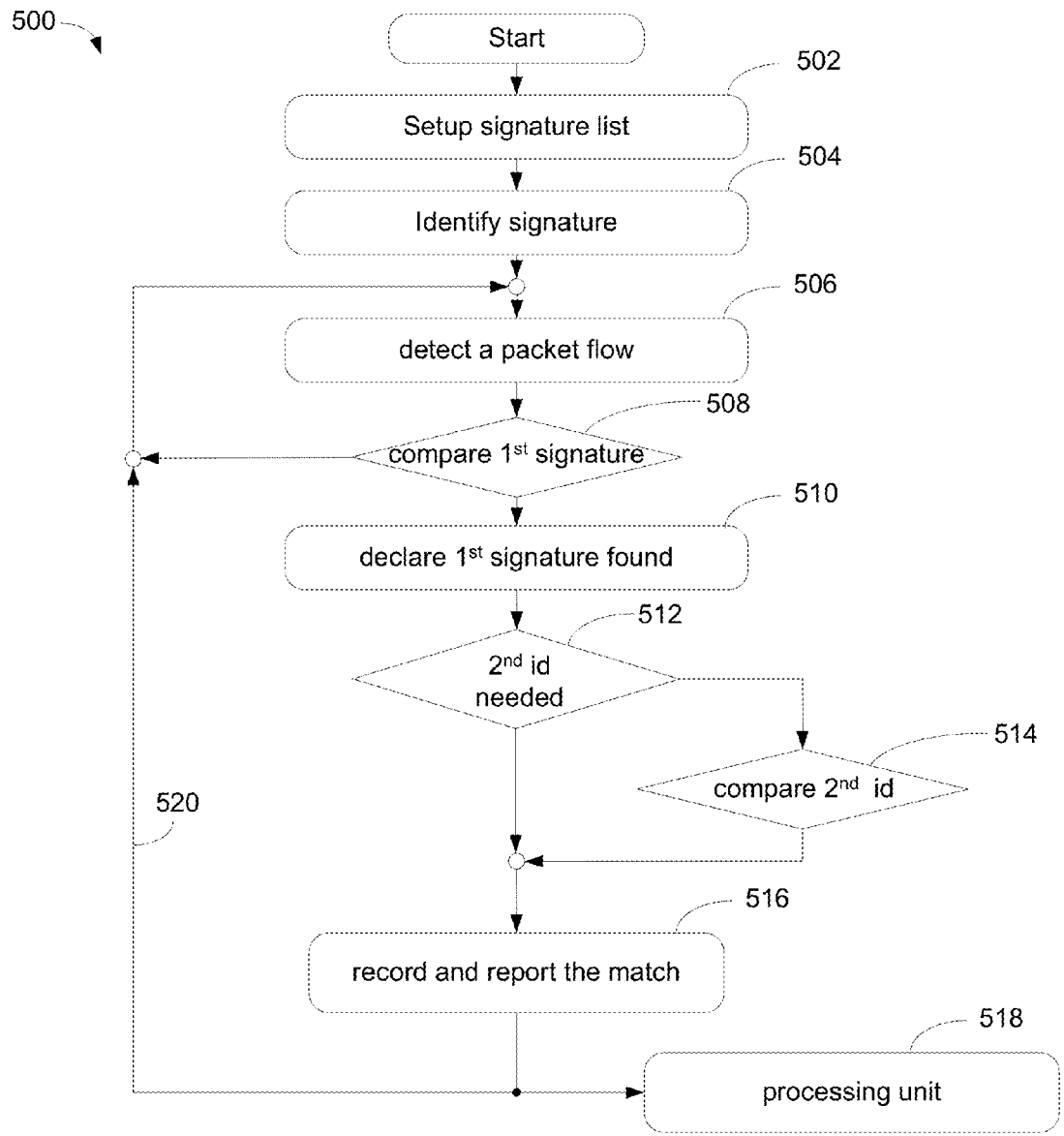
FIG. 5 is a flowchart illustrating a process of providing content-based netflow using signatures in accordance with one embodiment of the present invention.

FIG. 5 is a flowchart 500 illustrating a process of SCI for packet tracking in accordance with one embodiment of the present invention. At block 502, a process for network management sets up a signature list in its database for content-based monitoring. It should be noted that the database may store a long list of signatures received from a central office. At block 504, the process identifies a bit pattern or patterns of a signature in accordance with the signature list. A packet flow traveling through a communications network is detected at block 506. At block 508, a first predefined pattern of signature is compared with at least a portion of signature of a packet flow. If the first match of signature is found, the process proceeds to block 510 declaring that first pattern is identified. Otherwise, the process proceeds to block 506 to wait for the next flow.

At block 512, the process exams whether a secondary pattern comparison is needed. If the secondary pattern comparison is not needed, the process proceeds to block 516. Otherwise, the process proceeds to block 514. At block 514, a second predefined pattern of signature is compared with another portion of signature of the packet flow. For example, the first predefined pattern of signature may be sid while the second predefined pattern may be cid. Also, the second predefined pattern may be destination address, source address, or decryption key.

At block 516, the process records and issues a match of signature when predefined bit pattern of signature is found in the packet flow. The process issues an instruction to processing unit to handle the identified flow according to the subscription or the signature depending on the applications. At block 518, the processing unit may redirect or re-route the packet flow to a predefined network element in accordance with the subscription. The process then proceeds to block 506 via path 520 to wait for the next packet flow.

Figure 6:
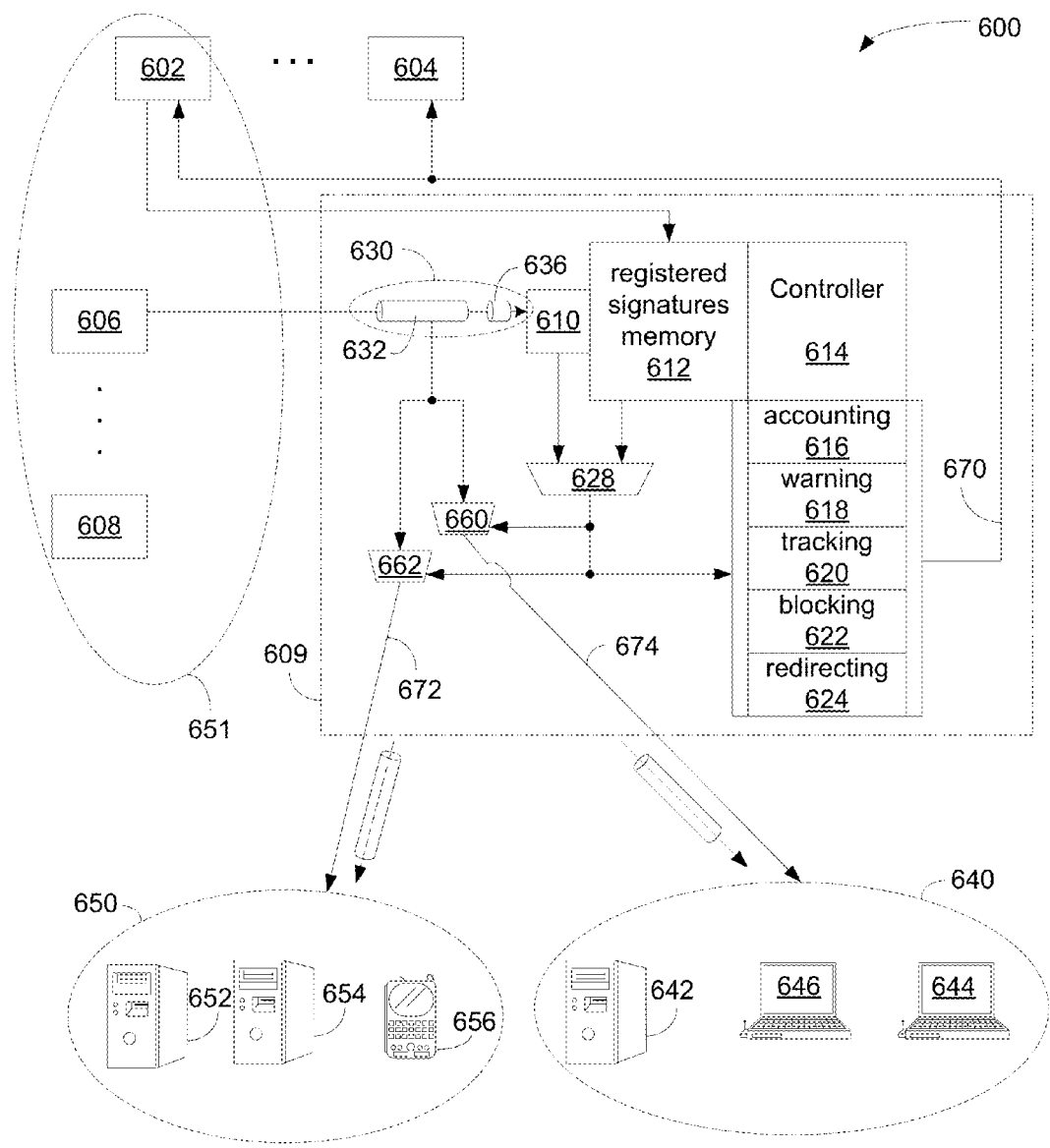
FIG. 6 illustrates a logic flow diagram capable of tracking unauthorized distribution of content-based netflow using signatures in accordance with one embodiment of the present invention.

FIG. 6 illustrates a logic flow diagram 600 capable of tracking unauthorized distribution of content-based netflow using signatures in accordance with one embodiment of the present invention. Diagram 600 includes subscribers 602-604, content providers 606-608, SCI 609, nodes 640 and 650. SCI 609 further includes memory 612, controller 614, receiver 610, comparator 628, and gating units 660-662. Controller 614, in one embodiment, also includes accounting unit 616, warning unit 618, tracking unit 620, blocking unit 622, and redirecting unit 624. The underlying concept of the exemplary embodiment(s) of the present invention would not change if one or more blocks (or units) were added to or removed from diagram 600.

Subscribers 602-604 can be end users, vendors, companies, government agencies, network providers, and the like. Subscriptions supplied and/or registered by subscribers 602-604 are loaded or stored in memory 612. Subscription, in one example, includes identity of subscriber(s), signature(s), destination(s), source(s), action(s), statistic data, and billing information.

Content providers 606-608 can be online movie/film providers, electronic online book vendors, music download retailers, medical records, military secrets, and so forth. Node 650 includes user equipments ("UEs") 652-656 and node 640 includes UEs 642-646. Node 651, in one example, includes providers 606-608 and subscriber 602. Subscriber 602, content provider 606, and node 650, for example, may be the same company whereby the subscription submitted by subscriber 602 may allow signature-based data packets to be transmitted between nodes 651 and 650.

In an operation, when a signature-based packet flow 630 travels from content provider 606 to SCI 609, a portion of packet flow 630 enters receiver 610 while another portion (or copy) of packet flow 630 travels to gating units 660-662. For example, signature 636 of packet flow 630 enters receiver 610 and the rest of packet flow 632 including payload 632 moves to gating units or circuits 660-662. Upon receipt of signature 636, controller 614 searches through its database in memory 612 to locate a predefined signature in accordance with signature 636. Upon identifying and retrieving the predefined signature, signature 636 and predefined signature are compared at comparator 628. If signature 636 matches with predefined signature, controller 614 selects gating units 660-662 based on the subscriptions. For example, packet flow 630 is allowed to travel to node 650 via connection 672 since flows are permitted within the same company as indicated by the subscription. Packet flow 630 may be blocked or redirected from traveling over connection 674 to node 640 because the subscription indicates blocking and/or redirecting for any unauthorized distribution.

If signature 636 matches with the predefined signature, accounting unit 616, in one embodiment, records flow status including detections, destinations, sources, redirections, and the like. If a warning note or message is requested in accordance with the subscription, warning unit 618 sends a warning message via connection 670 to subscriber 602 warning unauthorized distribution. Subscriber 602 may, according to subscription, elect to overwrite or intervene the unauthorized distribution. For example, upon receipt of warning, subscriber 602 may overwrite the redirection and allow the transmission to complete. SCI 609 can also activate tracking unit 620 to track movement of packet flow 630 in accordance with the subscription. If the subscription or signature does not allow unauthorized distribution, blocking unit 622 is capable of blocking packet flow 630 from reaching its destination. In addition, SCI 609 may also instruct redirecting unit 624 to reroute the packet to a predefined handler or destination. For example, an IP theft handler is used to handle redirected illegal transmission of proprietary IP protected asset.

Alternatively, if signature 630 fails to match with any of the predefined signatures stored in memory 612, packet flow 630 is allowed to reach its destination. To provide content security over network transmissions, SCI 609 is able to use signature-based content tracking process in the core network to monitor packet flows using known, predefined, or pre-agreed signatures in order to detect unauthorized distribution of protected documents (i.e., government secrets) over specific network or network routes. Signature can be encrypted or authenticated. To prevent illegal distribution of protected content from un-authorized websites, SCI 609 is able to monitor, identify, and track packet flows identified by signatures. For example, a video with known signature pattern passing through a network can be detected by service provider(s). Upon identifying a packet flow with the signature, service provider reports source address of content distributor and/or destination address of content recipient to the owner (or subscriber) of the video file. Owner or subscriber of video file can subsequently determine whether to authorize the transmission or block the packet flow from reaching its destination.

Figure 7:
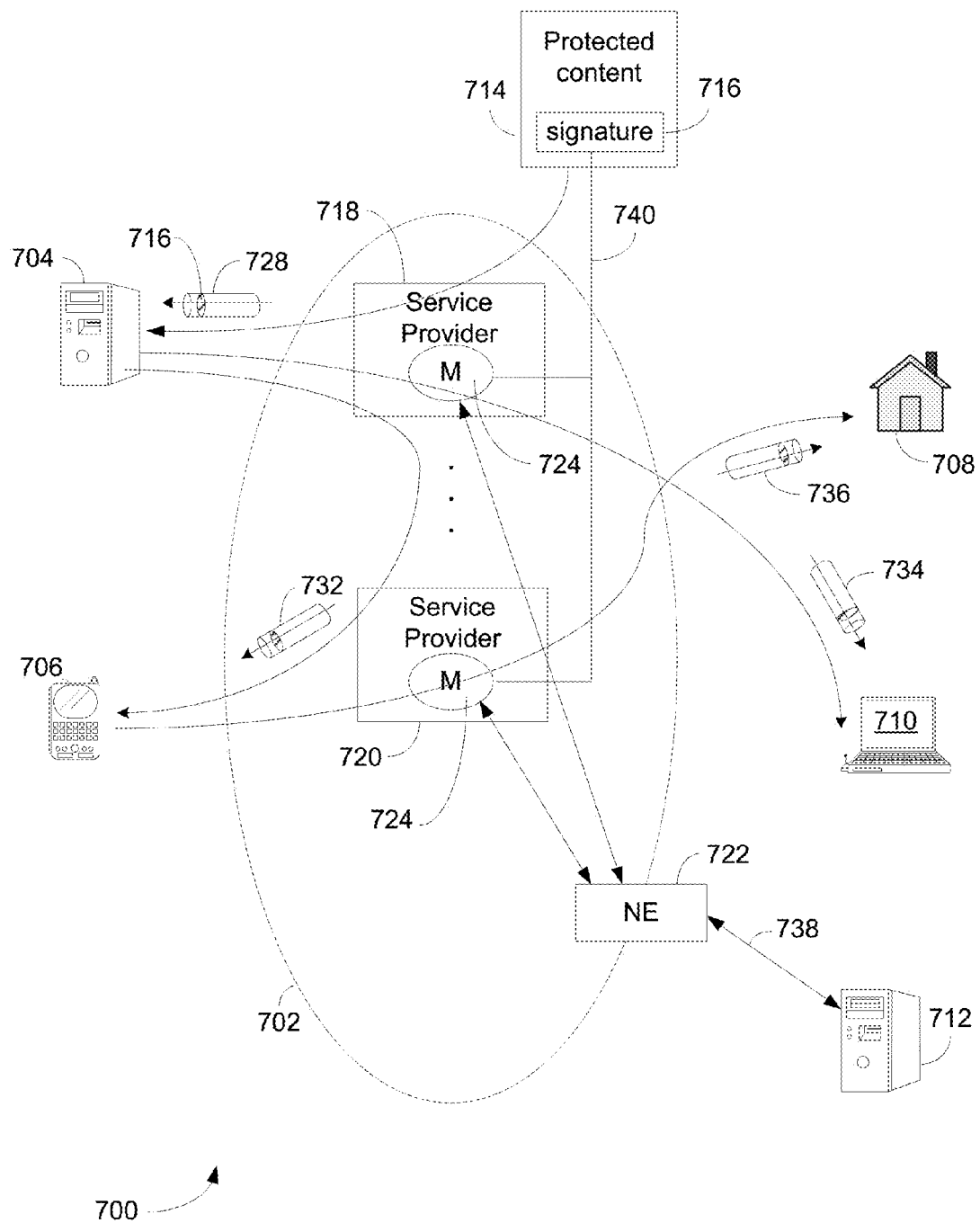
FIG. 7 illustrates a logic flow diagram capable of detecting and monitoring unauthorized or illegal distribution of proprietary articles and assets over a network in accordance with one embodiment of the present invention.

FIG. 7 illustrates a logic flow diagram 700 capable of detecting and monitoring unauthorized or illegal distribution of proprietary articles and/or assets over a network in accordance with one embodiment of the present invention. Diagram 700 includes content provider 714, UEs 704-712, and a network 702. Network 702 includes multiple network service providers 718-720 wherein each service provider 718 or 720 includes a tracking management 724 such as SCI for identifying and tracking identified packet flows. Diagram 700, in one embodiment, also includes an NE 722 which is used to implement at least a portion of SCI functions.

To monitor and/or secure IP protected content from illegal distribution, SCI, for example, is used to monitor, identify, and/or track packet flows identified by signatures. IP protected content includes, but not limited to, copyrighted books, trademarks, patent protected inventions, proprietary confidential information, and the like. For example, an entertainment company adds specific bit pattern or signature to a video file and share the bit pattern or signature with various service providers 718-720 for flow tracking. Service providers 718-720 subsequently identify and/or track users (or UE) who accessed video file identified by the bit pattern or signature. SCI is able to identify user IP address (who accessed the signature indicated content) at any point or place in a network and reports back to the entertainment company or subscriber regarding users who access the protected video file(s).

Upon identifying the bit pattern or signature, the entertainment company compares the information from SCI with its own record of customers to determine whether the transmission of packet flow is legal or illegal. SCI, in one embodiment, is also able to provide identity of all unauthorized users. To prevent illegal distribution of protected content from reaching to unauthorized sites, SCI identifies and tracks packet flows identified with signatures. For example, if a video with known signature pattern is detected, service provider reports the source address of content distributor to the owner of the video file and the owner can subsequently check and determine whether the distribution should be allowed.

During an operation, subscriber 714, who can also be a content provider, registers or submits a subscription including signature 716 to service providers 718-720. The subscription, for example, requests service provider to track packet flows identified by signature 716. Note that signature 716 can be a readable signature or hidden signature. The hidden signature means the signature is hidden from average users or devices. When UE 704 download signature-based content 728 from content provider (or subscriber) 714 via service provider 718, SCI 724 detects and records the download or transmission and reports to NE 722 indicating an authorized transmission had taken place. When provider 718 detects signature-based contents 732-734 that travel from UE 704 to UEs 706 and 710, SCI 724 in service provider 718 reports to NE 722 that an unauthorized transmissions is detected. Similarly, when provider 720 detects signature-based contents 732 traveling from UE 704 to UE 706 and signature-based content 736 traveling from UE 706 to UE 708, SCI 724 in service provider 720 reports the occurrences of unauthorized transmissions to NE 722. NE 722, in one embodiment, reports the aggregated data or statistics to content provider 714 on a periodic basis or in accordance with the subscription.

An advantage of using SCI for monitoring legal and illegal downloading is to provide a marketing statistics indicating, for example, how many downloads are authorized while how many downloads are unauthorized. Companies, such as entertainment industries and/or electronic book vendors, can adjust their business model to capture or enhance their market share according to the marketing statistics.

Figure 8:
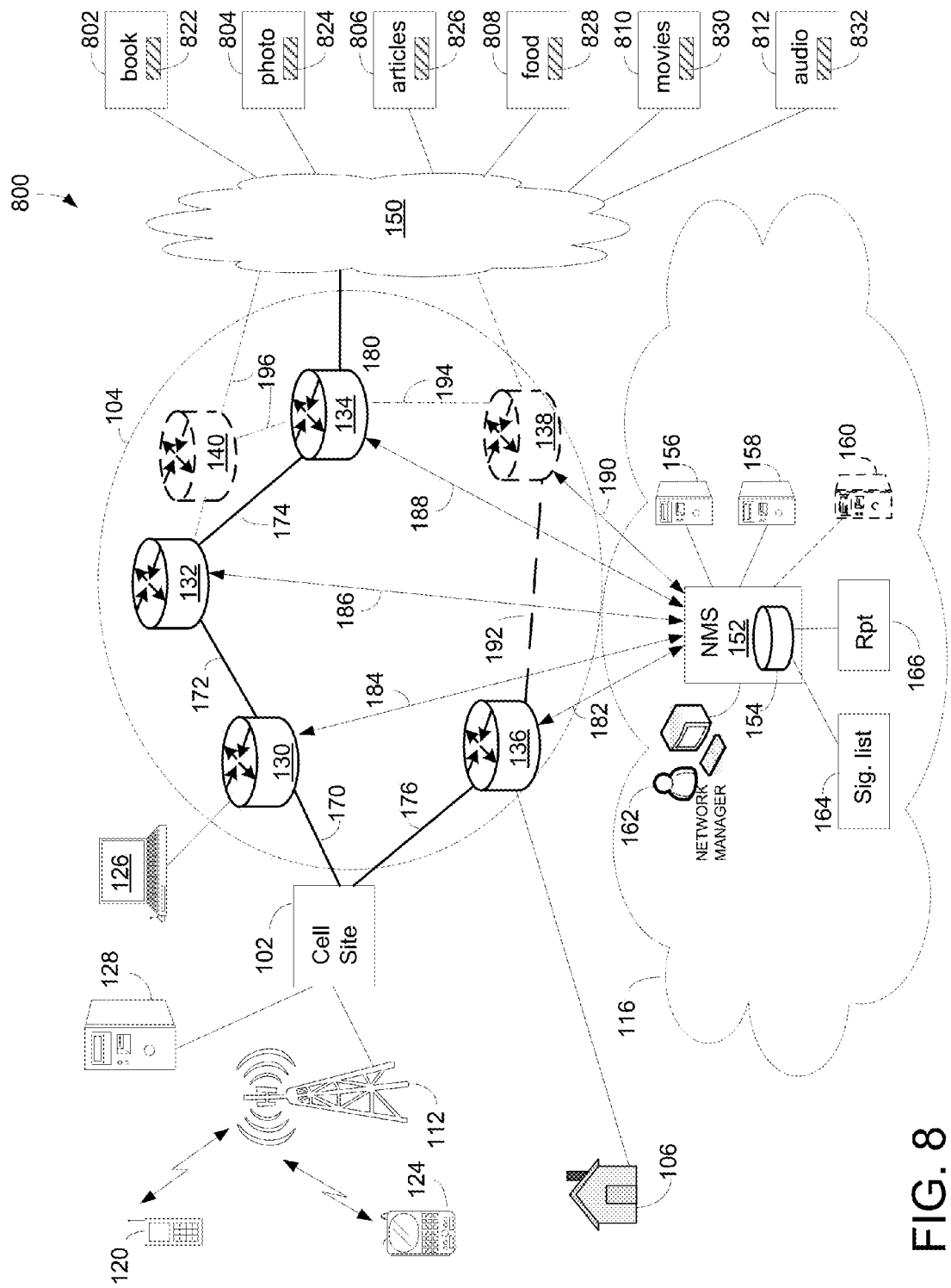
FIG. 8 is a block diagram illustrating a computer network capable of monitoring signature-based content packet flows in accordance with one embodiment of the present invention.

FIG. 8 is a block diagram 800 illustrating a computer network capable of monitoring signature-based content packet flows in accordance with one embodiment of the present invention. Diagram 800, which is similar to diagram 100 shown in FIG. 1, includes a cell site 102, a switching network 104, a central office ("CO") 116, and Internet 150, wherein Internet 150 is further coupled with signature-based content providers 802-812. CO 116 provides network management to facilitate network communication between users such as UEs 120 and 124 and signature-based content provider 802-8128 via switching network 104, Internet 150, and cell site 102.

To provide marketing research and/or statistics, content-based accounting or SCI enables network operator to track number of session when specific content on the network is accessed. The specific content includes books, photos, articles, product names. The accumulated or collected data can be used by various interested parties such as market agency. For example, an author of a book may pay service provider to obtain information regarding how many users or readers actually downloaded and/or read his or her book. The marketing agency, for instance, may want to know the identity of user(s) who downloaded specific photo(s). It should be noted that a signature pattern can be added to digitalized photo whereby the digitized phone with the signature can be tracked over various communication networks.

Signature-based book provider 802 contains a book signature 822. For any download(s) from signature-based book provider 802, SCI 154, for example, records the download information including source and destination. Similarly, SCI 154 records download or transmission from signature-based photo provider 804 having a photo signature 824. SCI 154 further records and/or tracks transmissions to and from content providers 806-812 with signatures 826-832 to track articles, movies, and audio downloads. The recorded information relating to downloads and/or transmissions is stored in a memory. The recorded data or data can be subsequently retrieved for generating a report upon requests. For example, entertainment institutions may be interested in knowing which movie is most watched.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components. While embodiments of the present invention will be described with reference to the Internet, the method and apparatus described herein is equally applicable to other network infrastructures or other data communications environments.

Figure 9:
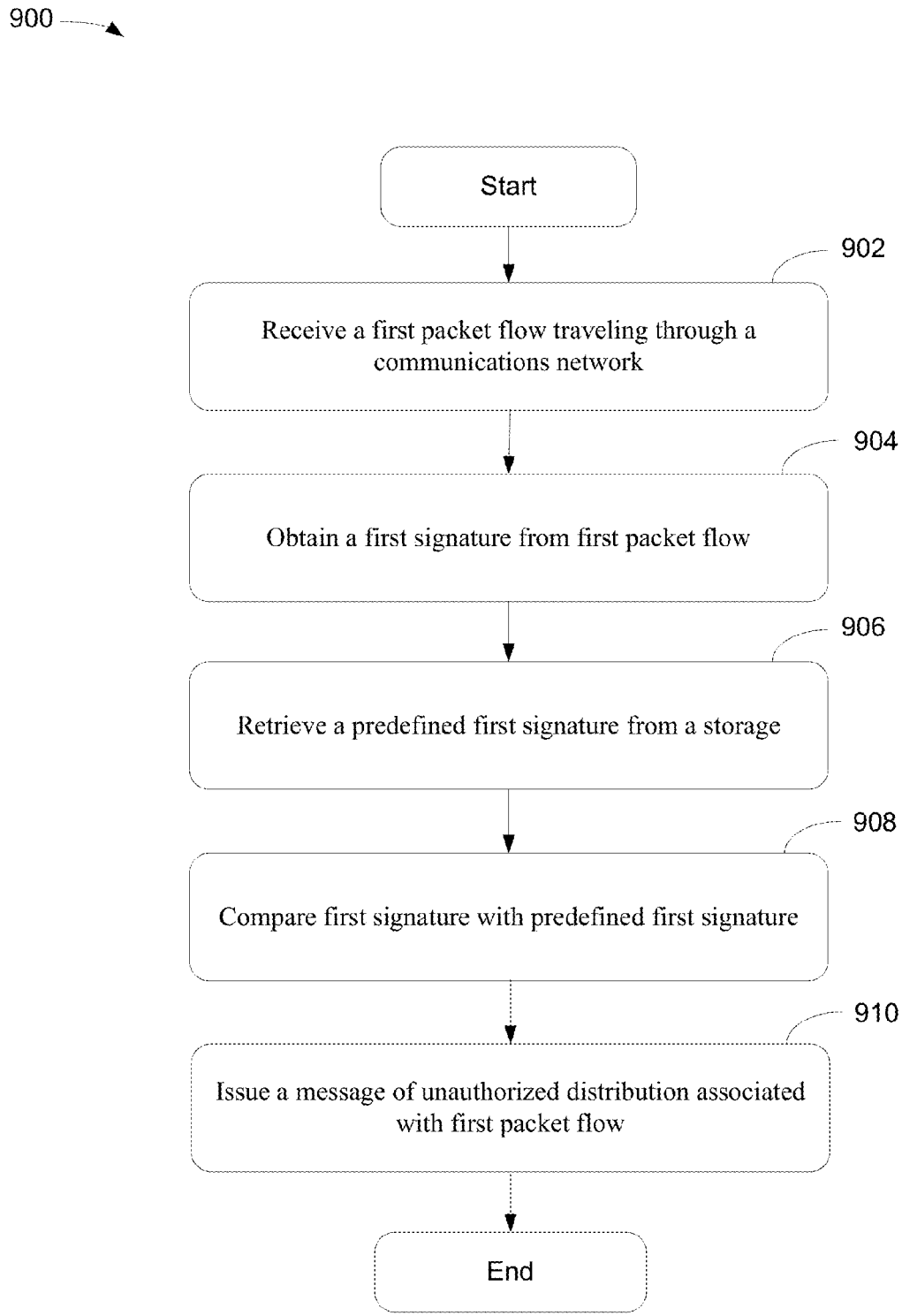
FIG. 9 is a flowchart 900 illustrating a process for providing signature-based content flow in accordance with one embodiment of the present invention.

FIG. 9 is a flowchart 900 illustrating a process for providing signature-based content flow in accordance with one embodiment of the present invention. At block 902, a process of monitoring network traffic is able to receive a first packet flow traveling through a communications network. In one embodiment, upon receiving multiple predefined signatures from subscribers, network traffic or packet flows in the communications network can be electively monitored and tracked in accordance with the predefined signatures.

At block 904, a first signature from the first packet flow is obtained. The signature is a set of unique bit sequence. For example, a set of bits from a predefined portion of the first packet flow such as the header is extracted for later comparison.

At block 906, a predefined first signature is retrieved from a storage location in accordance with the first signature. The predefined signatures are, for instance, supplied by subscribers or content providers. The process, in one embodiment, fetches sid and cid of the predefined first signature from local memory storage.

At block 908, a comparator compares the first signature with the predefined first signature. To identify whether the first signature is the same as the predefined first signature, sid of first signature, for example, is subtracted from the sid of predefined first signature and cid of first signature is subtracted from the cid of predefined first signature. If the comparison result is zero, a match is found.

At block 910, a message of unauthorized distribution associated with the first packet flow is issued when the bit pattern of first signature matches with the bit pattern of predefined first signature. In one embodiment, the first packet flow is allowed to travel through the communications network when the bit pattern of the first signature mismatches with the bit pattern of the predefined first signature. If the bit pattern of the first signature matches with the bit pattern of the predefined first signature, the subscriber may be notified in accordance with the subscription. In addition, upon redirecting the first packet flow to a predefined unauthorized distribution handler, source address and destination address of the first packet flow may also be recorded in accordance with the subscription. After receiving a second packet flow traveling through the communications network, a second signature from the second packet flow is obtained. Once retrieving a predefined second signature from the storage in accordance with the second signature, the second signature is compared with the predefined second signature. The process may issue a second message of unauthorized distribution associated with the second packet flow when bit pattern of the second signature matches with bit pattern of the predefined second signature.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for monitoring network traffic traveling through a router coupled to a communication network, the communication network containing a plurality of network elements capable of transmitting data between network devices, the method comprising:

receiving a predefined first signature from a first subscriber over the communication network and storing the predefined first signature;

detecting a first packet flow traveling through the router to its destination via a content-based monitoring process;

extracting a plurality of bits representing a first signature identifying content of the first packet flow from a predefined location the first packet flow;

retrieving the predefined first signature from a storage in accordance with the first signature;

comparing the first signature with the predefined first signature;

facilitating an issuance of a message indicating unauthorized distribution associated with the first packet flow when bit pattern of the first signature matches with bit pattern of the predefined first signature;
facilitating to prevent the first packet flow from traveling to its destination in accordance with the message of unauthorized distribution; and
generating a report indicating accumulative statistics of data streams traveling through the communications network and providing a market analysis in accordance with recorded data relating packet flows traveling through the communications network.

2. The method of claim 1, further comprising notifying the first subscriber regarding the unauthorized distribution associated with the first packet flow.

3. The method of claim 1, further comprising,
redirecting the first packet flow to a predefined unauthorized distribution handler; and
recording source address and destination address of the first packet flow.

4. The method of claim 1, wherein detecting a first packet flow traveling through a router to its destination via a communications network includes,
receiving a plurality of predefined signatures from a plurality of subscribers; and
monitoring network traffic in the communications network in accordance with the plurality of predefined signatures.

5. The method of claim 4, wherein extracting a first signature from a predefined location in a head portion of the first packet flow includes extracting a set of bits from a predefined portion of the first packet flow.

6. The method of claim 5, wherein retrieving the predefined first signature from the storage includes fetching subscriber identification ("sid") of the predefined first signature and content identification ("cid") of the predefined first signature from a local memory storage.

7. The method of claim 6, wherein comparing the first signature with the predefined first signature includes subtracting sid of first signature from the sid of the predefined first signature and subtracting cid of first signature from the cid of the predefined first signature.

8. The method of claim 1, comprising,
receiving a second packet flow traveling through the communications network;
obtaining a second signature from the second packet flow;
retrieving a predefined second signature from the storage in accordance with the second signature;
comparing the second signature with the predefined second signature; and
issuing a second message of unauthorized distribution associated with the second packet flow when bit pattern of the second signature matches with bit pattern of the predefined second signature.

9. A method for monitoring protected content traveling through a router coupled to a communication network, the communication network containing a plurality of network elements capable of transmitting data between network devices, the method comprising:
receiving a plurality of predefined digital signatures identifying content of packets from a plurality of subscribers across the communication network;
identifying the plurality of predefined digital signatures associated with a plurality of protected content;
monitoring network traffic traveling through the router during a content-based monitoring;
detecting a first packet flow passing through the router to its destination and extracting a plurality of bits representing a first digital signature from a content portion of the first packet flow;
identifying a match when the first digital signature matches with one of the plurality of predefined digital signatures;
facilitating to prevent the first packet flow from traveling to its destination in response to the match and reporting the match indicating an access of first protected content to a first subscriber who provides the one of the plurality of predefined digital signatures; and
generating a report indicating accumulative statistics of data streams traveling through the communications network and providing a market analysis in accordance with recorded data relating packet flows traveling through the communications network.

10. The method of claim 9, further comprising:
recording source address and destination address of the first packet flow; and
allowing the first packet flow to be routed.

11. The method of claim 10, further comprising:
issuing an authorized transfer if the source address of the first packet flow matches with a predefined source address; and
issuing an unauthorized transfer if the source address of the first packet flow mismatches with the predefined source address.

12. The method of claim 10,
issuing an authorized transfer if the destination address of the first packet flow matches with a predefined source address; and
issuing an unauthorized transfer if the destination address of the first packet flow mismatches with the predefined source address.

13. The method of claim 10, wherein receiving a plurality of predefined digital signatures from a plurality of subscribers includes storing a plurality of subscriber identifications ("sid") and content identifications ("cid") in a local memory storage.

14. The method of claim 10, wherein monitoring network traffic traveling through a router includes detecting a plurality of data streams organized in packet format flowing through a communications network.

15. The method of claim 9, wherein detecting a first packet flow passing through the router to its destination and extracting a first digital signature from a head portion of the first packet flow includes,
retrieving a predefined first digital signature from a storage in accordance with the first digital signature;
comparing the first digital signature with the predefined first digital signature.

16. The method of claim 9, comprising:
detecting a second packet flow having a second digital signature that matches with one of the plurality of predefined digital signatures; and
reporting a match of a second protected content to the network element.

17. A method for accumulating content transfer traveling through a router coupled to a communication network, the communication network containing a plurality of network elements capable of transmitting data between network devices, the method comprising:
storing a plurality of predefined signatures identifying contents carried by packet flows from various subscribers situated over the communication network;

associating the plurality of predefined signatures with a plurality of content providers;

monitoring network traffic traveling through the router during a content-based monitoring in accordance with the plurality of the predefined signature;

extracting a plurality of bits representing a first signature from a predefined location of a first packet flow and comparing the first signature with the plurality of the predefined signatures;

facilitating to redirect the first packet flow from traveling through the router to its destination when the bit pattern of the first signature matches with bit pattern of one of the predefined signatures;

recording the first packet flow having one of the plurality of predefined signatures; and generating a report indicating accumulative statistics of data streams traveling through the communications network and providing a market analysis in accordance with recorded data relating packet flows traveling through the communications network.

18. The method of claim 17, wherein associating the plurality of predefined signatures with a plurality of content providers includes identifying a first unique signature for downloading at least a portion of a book.

19. The method of claim 17, wherein facilitating to redirect the first packet flow from traveling through the router to its destination includes, identifying transmission authorization if the first signature indicates confidential content in the first packet; and rerouting the first packet to an event handler if the transmission authorization is not activated.

* * * * *